May 17, 1932.  P. E. FENTON  1,858,441
SEPARABLE FASTENER
Filed Oct. 13, 1931
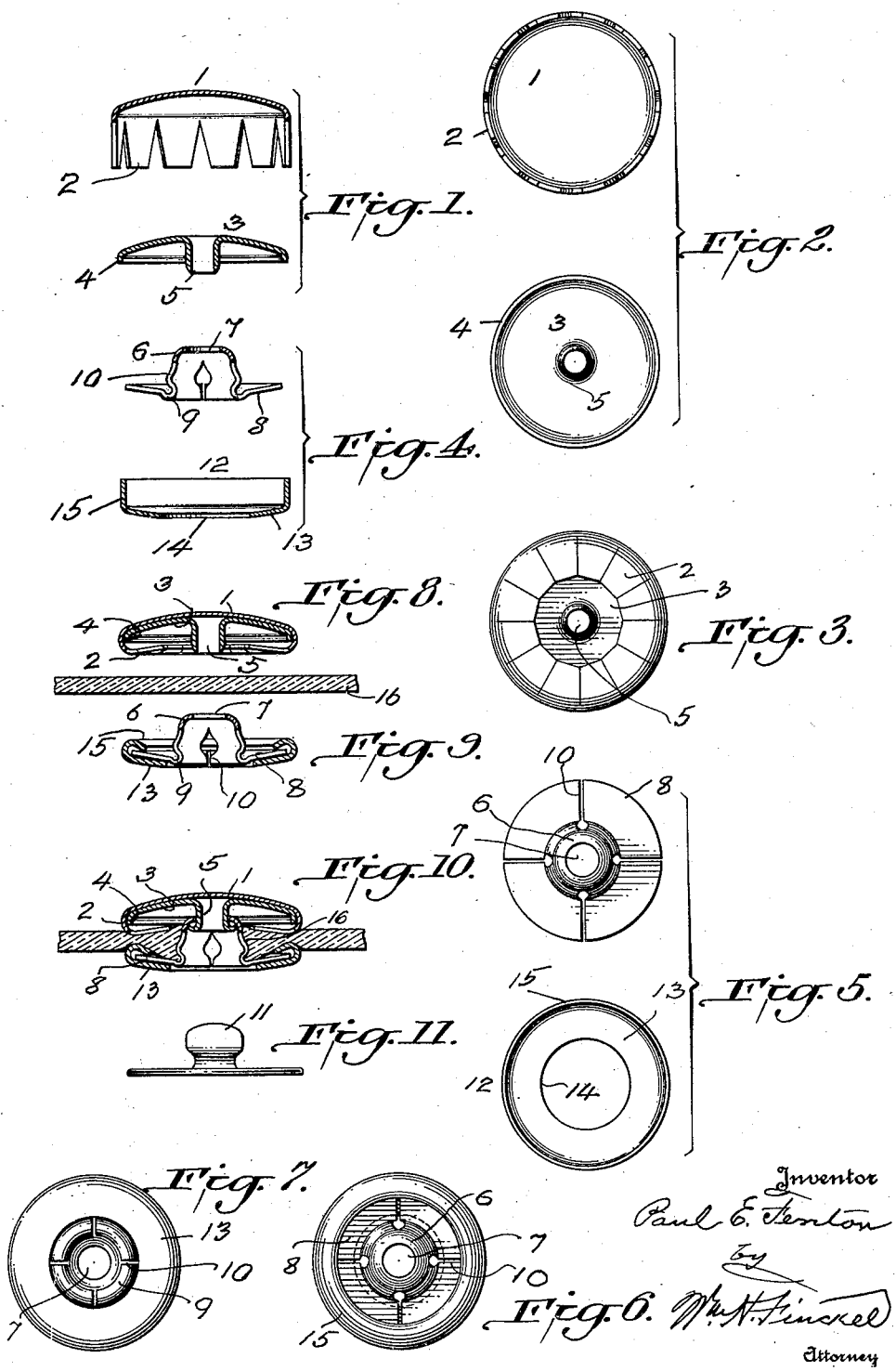

Patented May 17, 1932

1,858,441

UNITED STATES PATENT OFFICE

PAUL E. FENTON, OF THOMASTON, CONNECTICUT, ASSIGNOR TO SCOVILL MANUFACTURING COMPANY, OF WATERBURY, CONNECTICUT, A CORPORATION OF CONNECTICUT

SEPARABLE FASTENER

Application filed October 13, 1931. Serial No. 568,607.

The object of this invention is to provide a resilient socket member of a snap fastener couple, with a collet encircling the spring elements in such way as to shield these elements against destruction of the snap action in the event of the article on which the socket is used being dropped, as on a floor, and stepped on, and which will take any unusual blow, and which also will protect the socket when the article on which it is placed undergoes laundering, especially when passed through a wringer, and which also will prevent distortion when there is any unusual lateral strain that would tend to unduly separate or pull away any of the various spring elements.

The invention consists of a socket member of a snap fastener, composed of a barrel, an upwardly turned flange and a bead between the barrel and flange, these three parts being of one piece of metal, slitted longitudinally part way through the barrel and entirely through the bead and flange, to impart resilience to the socket member, and having a collet comprising a bottom provided with a central opening and a flange encircling and closed about the flange of the socket member in such way as to permit resilient action in connecting the socket with a complemental stud member and disconnecting it therefrom, the collet being of relatively thicker or heavier metal than the metal of the other parts and sufficient in strength to absorb the destructive effects of passing through a wringer, the bottom of this collet being relatively straight and in close contact with the bottom of the upwardly turned flange of the socket member and so constructed that the exposed edge of its opening lies beyond the plane formed by the bead of the resilient socket, said collet being a dead member which serves to completely absorb the crushing effect of a wringer on the resilient bead of the socket were it not so shielded by the collet, as I will proceed now to explain more fully and finally claim.

In the accompanying drawings illustrating the invention, in the several figures of which like parts are similarly designated, Figure 1 shows in cross section the cap and connector therein. Fig. 2 shows bottom plan views of the parts shown in Fig. 1. Fig. 3 is a bottom plan view of the parts of Figs. 1 and 2 assembled. Fig. 4 shows in cross section the resilient socket member with its beaded and flanged edge and the collet. Fig. 5 shows in top plan view the resilient socket and the collet. Fig. 6 is a top plan view, and Fig. 7 is a bottom plan view of the completed socket member. Fig. 8 is a transverse section of the assembled cap piece and connector, and Fig. 9 is a transverse section of the socket with the collet applied thereto, the parts in these two views being arranged on opposite sides of what may represent a piece of a garment. Fig. 10 is a cross section of the assembled cap and socket mounted on an object, and Fig. 11 is a side elevation of a stud arranged in line beneath the socket and to be engaged by said socket.

While the cap may be any of a variety of constructions, I will describe the one shown in the drawings as being an efficient example of the invention. As thus shown, the cap includes a finish piece 1 having the dentated or fingered flange 2, and within this finish piece is arranged an eyelet-like part or connector 3 having a top which corresponds with the contour of the inside of the cap 1 and is provided with a downturned edge flange 4 and a central downwardly projecting tubular portion 5. The parts of the dentated flange 2 are turned in beneath the connector, as shown in Figs. 3, 8 and 10, so as to unite these two parts.

The socket member is shown as composed of the barrel portion 6 having an opening 7 in its top and an upwardly flared flange 8 at the bottom, the flange merging with the barrel through the medium of the bead 9, and a portion of the barrel and all of the bead and the flange being provided with slits 10 so as to render the socket resilient for engagement with any type of complemental stud, such as the non-resilient or rigid stud 11, shown in Fig. 11. The bead 9 projects inwardly into the barrel portion 6 and downwardly below the flange 8 at the junction of the barrel portion and its flange 8.

The collet 12 has a substantially flat or straight bottom 13 inclined to parallel the flared flange 8 having a central opening 14 and the flange 15, and said collet is made of relatively thicker or heavier metal than the metal of the other parts of the socket member. This flange 15 forms an obtuse angle with the bottom 13. The collet is applied to the flange 8 of the socket member by placing its open bottom against the bottom of the flange 8 and curling its flange 15 over the top of the said flange; the edge of the opening in the bottom 13 closely approaching the bead 9 in a level substantially below the said bead so as to protect the bead and consequently the socket from being crushed or distorted and the resilience of the socket impaired when exposed to pressure in a laundry. The flange 15 of this collet overlies the edge of the flange of the socket to effect engagement of the collet with the said flange.

The use of the terms "below" and "overlie" is relative to the structure as shown in the drawings.

The socket passes through an object, represented at 16 from one side of said object, and then the cap has the tubular portion 5 of the connector passed through the object and into the opening 7 in the socket and clinched within the socket, as represented in Fig. 10, so as to connect or unite the cap and the socket member and secure the capped socket in position for use on an object.

The use of heavy metal in the manufacture of the collet adds strength to the socket and resistance to the crushing or deformation of the resilient portions of the socket when the device is subjected to pressure in a wringer or other laundry apparatus.

Variations in the details of construction are permissible within the principle of the invention and the scope of the claim following.

What I claim is:—

A separable fastener socket, having a resilient barrel portion and a resilient upwardly turned flange extending laterally from and integral with its lower end, and a bead projecting inwardly into the barrel portion and downwardly below said resilient flange at the junction of the barrel portion and said flange, and a collet of metal heavier than the metal of the barrel portion and its flange and provided with a straight bottom underlying the bottom of the flange and extending in close proximiy to the bead and below the level of the bead and in close contact throughout its width with the outer face of the upwardly turned flange and having a flange forming an obtuse angle with the straight bottom and of less width than the bottom of the collet and curled loosely upon the top of the resilient flange to permit the expansion and contraction of the socket in the engagement with and disengagement from a complemental stud, said barrel portion having a hole in its top, combined with a cap having a connector provided with a tubular portion which enters said hole in the barrel portion and is clinched therein to set the device upon an object.

In testimony whereof I have hereunto set my hand this 9th day of October, A. D. 1931.

PAUL E. FENTON.